United States Patent Office 3,232,113
Patented Feb. 1, 1966

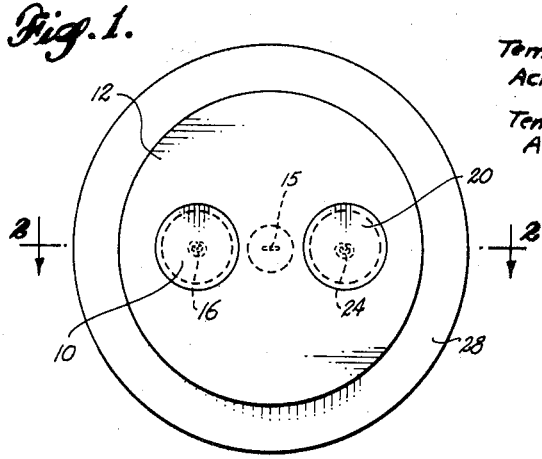
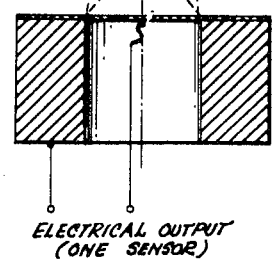
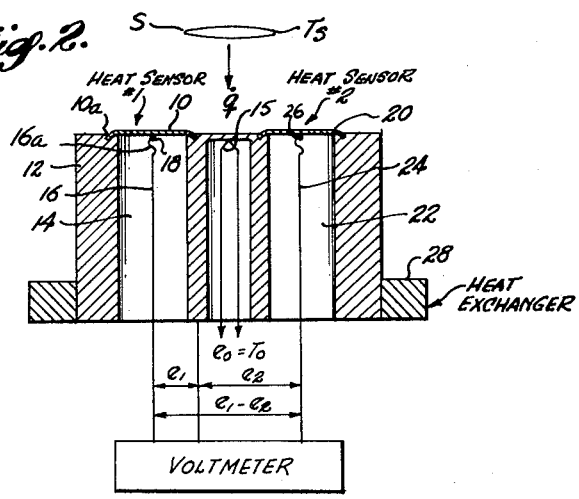
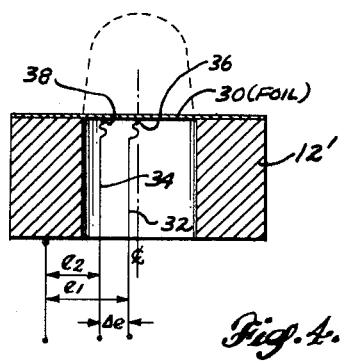
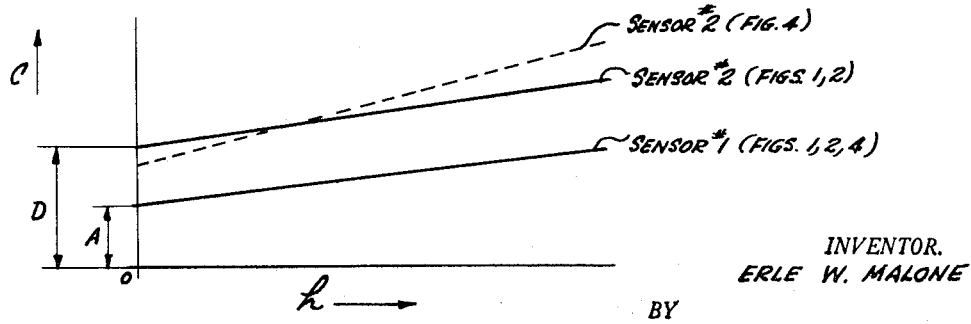

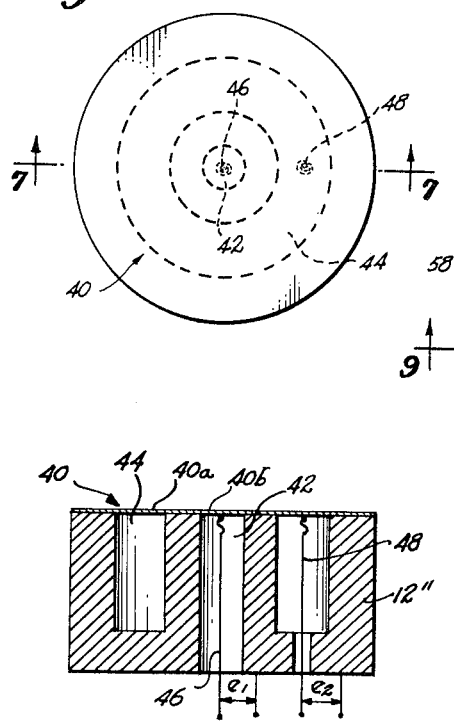
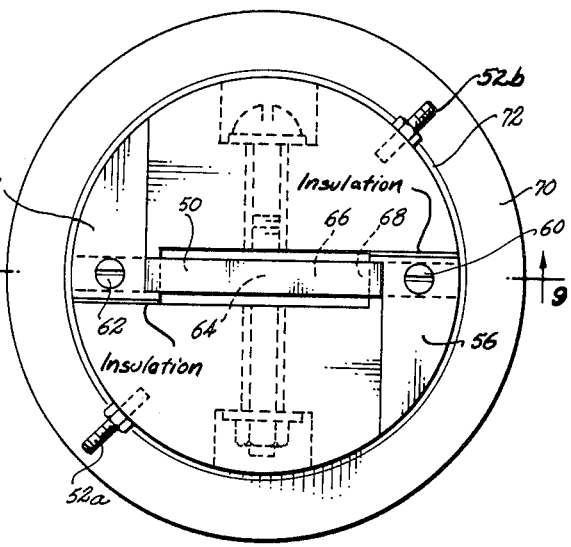
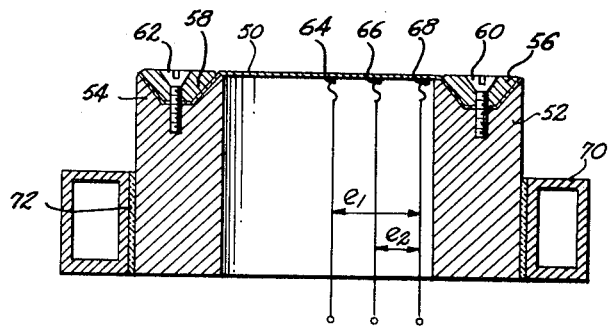
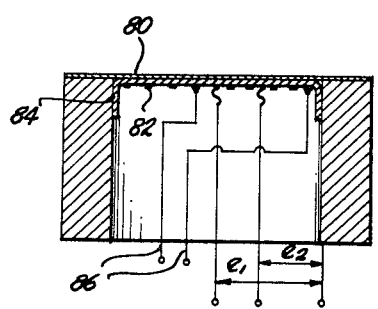

3,232,113
THERMAL PARAMETER INDICATOR
Erle W. Malone, Seattle, Wash., assignor to The Boeing Company, Seattle, Wash., a corporation of Delaware
Filed Oct. 2, 1961, Ser. No. 142,054
8 Claims. (Cl. 73—355)

This invention relates to improved thermo-electric devices for measuring thermal parameters including radiant source temperatures and heating rate from any source, whether by radiation or convection, and the heat transfer coefficient between the source and the measuring element. The invention is herein illustratively described by reference to presently preferred embodiments thereof; however, it will be recognized that certain modifications and changes therein with respect to details may be made without departing from the essential features involved.

Indicators of this invention are capable of measuring temperatures which exceed the melting point of any known thermocouple material. They are superior to optical pyrometers in their lesser sensitivity to the emissive power of the radiating surface. Moreover, the improved indicators are capable of true calorimetric measurements, since they are insensitive to radiation surface conditions (i.e., whether the surface follows the radiation distribution of a "grey body" or not) and indicate the effective temperatures of the total energy of the surface.

In addition indicators of this invention are capable of measuring heating rate from any source and may be constructed with very short time-constants.

Principles of thermal radiation measurement employing energy absorption disks thermally joined to a heat sink and provided with thermocouple output connections are disclosed in "Review of Scientific Instruments," volume 24, No. 5, page 366. Thermal radiation measurement as disclosed in that article did not provide sufficient information to determine the thermal parameters mentioned hereinabove. A broad object of this invention is to provide measuring instruments for determining all thermal parameters, and particularly source temperature $T_s$ and thermal transfer coefficient $h$ with relation to a radiation source.

Related objects are to perform these measurements with instrumentalities that lend themselves to flush mounting in solid surfaces, which are operable to measure extremely high temperatures, which can perform the indicated measurements through a solid angle approaching a hemisphere, which avoid lengthy data reduction computations, which are adapted to provide output data over sustained periods, and which are relatively insensitive to loss coefficients, such that loss coefficients need not be determined precisely in order to obtain accurate interpretation of readings.

A further object of the invention is to provide improved calorimetric devices which are readily calibrated electrically.

A further object is to provide improved thermal parameter indicators which can be manufactured at relatively low cost and which are thermally rugged and stable.

Still another object is an improved thermal parameter indicator capable of operating in any of various high-temperature environments which would adversely affect the operability or accuracy of most previous measuring devices.

A characterizing feature of this invention lies in the use of two heating rate sensors having surfaces at respectively different temperatures as a means to determine both the thermal transfer coefficient and the remote source temperature. Each heating rate sensor comprises a conductive strip terminating on a heat sink maintained at a temperature different from the source temperature, and with a thermocouple wire terminating on the strip at a location spaced from the connection to the heat sink. By relating one point on the strip to a reference temperature represented by the thermal sink, exposure of the strip to the temperature source results in a temperature distribution gradient along the strip and heating of the thermocouple junction spaced from the sink. In one embodiment separate strips with different thermal response characteristics are used for the respective heating rate sensors. In that embodiment the sensor surface temperatures at the joint of measurement are not equal. In another embodiment a common strip is used for the two heating rate sensors by locating their principal thermocouple junctions at respectively different points (and thereby at different surface temperature locations) along the strip spaced from the connection ("cold" junction) to the heat sink. As a refinement of the latter embodiment, provision may be made to calibrate the heating rate sensor by subjecting the thermal junctions to known thermal energization, as by passing electric current through the strip, in order to simulate the thermal gradient conditions of measurement. In this manner effective thermal transfer coefficient values for the thermocouple junction points may be established. If separate strips are used for the respective heating rate indicators a difference of thermal transfer coefficient as between the two strips is achieved by employing strip materials of different thickness.

In effect, the combination of two heating rate sensors having measurement junctions at different temperatures enables the solution of two simultaneous heat transfer equations for heating rate in terms of heat transfer coefficient and of the difference between temperature of the source and temperature of the heating rate sensor elements.

These and other features, objects and advantages of the invention will become more fully evident from the following description thereof by reference to the accompanying drawings.

FIGURE 1 is a face view of a thermal parameter indicator sensor of this invention.

FIGURE 2 is a longitudinal view taken on line 2—2 in FIGURE 1 and showing an indicator meter connected to the output terminals of the detector.

FIGURE 3 is a longitudinal sectional view through one of the heating rate sensors showing the temperature distribution across each of the two sensors.

FIGURE 4 is a longitudinal sectional view through a modified sensor in which two thermocouple junction wires cooperate with a single absorption strip.

FIGURE 5 is a graph showing variation of sensitivity of the sensors as a function of thermal transfer coefficient.

FIGURE 6 is a face view of a modified sensor; FIGURE 7 is a longitudinal sectional view of the same taken on line 7—7 in FIGURE 6.

FIGURE 8 is a face view of a further modification.

FIGURE 9 is a longitudinal sectional view thereof taken on line 9—9 in FIGURE 8.

FIGURE 10 is a longitudinal sectional view of still another modification.

Referring to FIGURES 1 and 2, the heat transfer rate $\dot{q}$ to or from a surface is a function of the temperature $T_s$ of the source, the heat transfer coefficient $h$ and the average temperature $T$ of the surface. These parameters are related as follows:

$$\dot{q} = h(T_s - T)$$

A calorimeter or heating rate sensor that indicates just $T$ and $\dot{q}$ does not provide sufficient information for determining $h$ and $T_s$. However, in accordance with this invention by employing two heating rate sensors or calorimeters that have surfaces at different temperatures when presented to the same temperature source, due to a difference in their sensitivities, sufficient data is provided to solve for the two unknowns $h$ and $Ts$. Thus, the heat transfer equations for the two sensors are as follows:

$$\dot{q}_1 = h(Ts - T_1)$$
$$\dot{q}_2 = hh(Ts - T_2)$$

Then:

$$\dot{q}_1 - \dot{q}_2 = h(T_2 - T_1)$$

and, solving for $h$, $$h = \frac{\dot{q}_1 - \dot{q}_2}{T_2 - T_1}$$

In effect, therefore, it is possible to determine $h$ directly from the above relationships once the quantities $\dot{q}_1$, $\dot{q}_2$, $T_1$, and $T_2$ have been measured by the two heating rate sensors. Once $h$ is determined it is possible to calculate $Ts$ directly from either of the two simultaneous heat transfer equations.

The above conditions are satisfied by providing two thin foil calorimeters of different sensitivities as shown in FIGURES 1 and 2. Thus, heat sensor #1 comprises a thin foil 10 of circular form having its peripheral edge 10a swaged into the face of a thermal sink comprising a block of copper 12, with the foil overlying the bore 14 formed in the block. This bore accommodates a thin conductor 16 (usually of copper) terminating at a generally central location on the back side of the foil strip 10 to form a thermocouple junction 18, as by spot-welding the tip of the wire to the strip. A coil or undulation 16a formed in the fine copper wire 16 avoids undue tension in the wire should the wire be fixed in relation to the copper block 12 and the foil 10 warp outwardly under exposure to the source temperature.

A second foil strip 20 similarly joined in thermal contact with the copper block 12 in registry with a second bore 22 therein serves as the second heat sensor. A fine copper wire 24 is spot-welded to the strip 20 at the thermocouple junction 26 as in the case of the wire 16. The foil 20 in this case is thicker than the foil 10, so that the latter has a greater sensitivity to source temperature than the foil 20. Preferably the copper block 12 is provided with a heat exchanger 28 which maintains its temperature at a value differing from temperature $Ts$ of the source S.

These foils are formed of a suitable thermocouple metal dissimilar from the copper used in the block and in the thermocouple wire, constantan being a suitable strip material for this purpose. However, materials other than constantan and copper may be used for the thermocouple materials if desired.

A thermocouple 15 or other temperature measurement device is provided in conjunction with the thermal sink 12 as a means to measure the temperature $T_0$ for reference purposes, it being noted that the swaging of the foil into the copper block serves as the "cold" junction of the thermocouple of each sensor.

In FIGURE 3 one of the sensors is shown in longitudinal section, in a symbolic form representative of both sensors in the units shown in FIGURES 1 and 2. In this view the temperature distributions across the foil strip of the two sensors are both depicted. Because of the lesser thickness of the foil 10 of sensor #1, the temperature of the foil intermediate its edges rises to a higher value than the temperature of foil 20 of sensor #2, assuming the source temperature $Ts$ is higher than the temperature of the heat sink 12. Moreover, the temperature distribution curve of sensor #1 is flatter across its upper portion than that of sensor #2. These differences result from the fact that the two foils have different temperature distributions that are functions of the heat transfer coefficient $h$.

The sensitivity C of each heat sensor may be expressed by the following equations:

$$\dot{q}_0 = C_1 e_1$$
$$\dot{q}_0 = C_2 e_2$$

where $e_1$ equals the electromotive force produced by the thermocouple incorporated in sensor #1 (FIGURE 2) and $e_2$ represents the electromotive force produced by the thermocouple incorporated in sensor #2.

Noting that $C_1 e_1 - C_2 e_2 = 0$, and that $e_1 - e_2 = N$, then $e_2(C_2 - C_1) = C_1 N$.

Now since $C_2 - C_1$ is known through theoretical determinations and calibrations, and since N is known by measurement, $C_1$ can be calculated directly as follows:

$$C_1 = e_2 \left( \frac{C_2 - C_1}{N} \right)$$

Referring to FIGURE 5, the sensitivity of the sensors may be expressed as follows:

$$C_1 = A + Bh$$
$$C_2 = D + Bh$$

Since A, B and D are known, $h$ may be determined as follows:

$$h = \frac{(C_1 - A)}{B}$$

and, once $h$ is determined, source temperature $Ts$ may be determined directly, as follows:

$$Ts = (\dot{q}_0 / h) + T_0$$

where $T_0$ equals the measured temperature of heat sink, i.e., of the sensor strip at the thermal junction thereof with the heat sink, and $\dot{q}_0$ is the heating rate to the undisturbed surface of the heat sink.

Therefore, it will be evident that all thermal parameters of the system may be determined by the use of the two heating rate sensors as shown in FIGURES 1 and 2.

Referring to FIGURE 4, it is found possible to produce a more compact instrument if instead of employing strips for the respective heating rate sensors, a single strip or foil 30 is used and separate thermocouple wires 32 and 34 are connected to this single strip at thermal junctions 36 and 38 respectively located at different points along the thermal gradient of the strip. In effect, therefore, the foil 30, the fine copper wire 32 and the copper block heat sink element 12' constitute one heat sensor, whereas the strip, the wire 34 and the block 12' constitute a second heat sensor. Because thermal junction 38 is located nearer to the thermal junction between the strip 30 and the block 12' than the thermal junction 36, the first-mentioned thermal sensor will be more sensitive than the second.

As illustrated in FIGURE 5, the sensitivity of the second thermocouple or sensor as a function of transfer coefficient will be different than it is in the case of FIGURES 1 and 2. Still the thermal parameters may all be determined from this single instrument as before using the known and measured data. As will be evident, the two-wire single calorimeter strip system shown in FIGURE 4 may be incorporated in a compact unit smaller in size physically than the unit shown in FIGURES 1 and 2.

In the further modification shown in FIGURES 6 and 7 the heat sink block 12" serves as a support and heat transfer means for the strip of constantan foil or other suitable material 40 which overlies the end face of the block and is suitably secured thereto in heat transfer thermocouple junction relationship. The block has a central bore 42 and an annular groove 44 opening against the inside surface of the strip 40 so as to support an annular zone 40a of the strip 40 overlying the annular groove 44 and a circular zone 40b of strip 40 overlying the end of the bore 42. A thermocouple wire 46 contacts the inside face of the foil in circular zone 40b and a second thermocouple wire 48 contacts the inside face of the foil in annular zone 40a. These copper wires in conjunction with the respective sections or zones of the strip material serve as the two heat sensor elements as indicated, producing the respective output differential thermocouple E.M.F.'s $e_1$ and $e_2$.

A convenient means for calibrating the two-wire heat flux transducer such as that shown in FIGURE 4 or a similar form is depicted in the construction shown in FIGURES 8 and 9. As illustrated, this device comprises an elongated strip 50 of constantan or suitable metal of uniform width and thickness having its ends in thermal junction contact with the respective heat sink block sections 52 and 54 by means of clamp elements 56 and 58 held by machine screws 60 and 62. The strip 50 stretches between these holding clamps in order to sustain a temperature gradient along its length when exposed to the flux from a heat source for measurement. Block section 52 is electrically insulated from block section 54. An electric power energizing terminal 52a is secured to block section 52 and a similar terminal 52b of opposite polarity is secured to block section 54. By applying voltage to these terminals energizing current flows through the strip 50 to heat it. It is found that the temperature gradient assumed along the length of the strip 50 when this heating current flows is essentially the same as that which develops along the length of the strip when the strip is presented to a temperature source for measurement. By measuring the applied electrical power heating the strip and by noting the area of the strip presented for measurement, it is possible to relate temperature differentials as measured at the respective thermocouple junctions 64, 66 and 68 to the heating rate of the strip. The unit may be calibrated with any desired degree of accuracy if these measurements are performed with the unit placed in an evacuated container so as to reduce convection losses to a negligible figure, and the block 52 is maintained at a suitable ambient temperature as by means of passing cooling water through a heat exchanger jacket 70 operatively associated with the block 52, 54, and insulated electrically from it by a thin layer of insulation 72. In calibration, a number of data points may be obtained by varying the applied electrical power in order to plot $e_1$ and $e_2$ as a function of power. With the unit thus calibrated it may be used as a standard by which to calibrate or measure any source of heat flux and by which to calibrate other sensors used for measuring thermal parameters.

The strip configuration illustrated (i.e., of uniform width and thickness throughout its length) is simplest for purposes of calibration according to the procedure described above because the heat generated from the unit area of the strip is constant for the entire length of the strip. This provides a temperature distribution along the strip that is equivalent to that which would be experienced if heat to the strip were to come from a source that had a thermal transfer coefficient approaching zero. However, other configurations for the strip may be used here as in the other embodiments of the invention.

In the embodiment shown in FIGURE 10 the strip 80 is of circular form and is heated by provision of a heating coil or element 82 of spiral configuration supported against the underside of a thin layer of electrical insulation 84 in turn placed directly against the underside of the strip. When electric current is passed through the spiral heater element 82 through the energizing leads 86 the strip becomes heated uniformly throughout its entire circular area and the necessary calibration curves may be obtained by varying the value of energizing current flowing and plotting the values of $e_1$ and $e_2$ as a function of the watts dissipated per unit area in the strip.

In the illustrated embodiments of the invention thermocouples are employed as the means to sense temperature of the foil or other strip at the selected thermal junction points. It will be recognized, however, that temperature may be measured at the "hot" and "cold" junction measurement points by other means, such as thermistors or other small resistance element thermometers appropriately mounted on or connected to the strip as required.

It is also noted that in the illustrated cases the foil or other strip material is shown to be of uniform thickness or cross section. In practice, nonuniform cross sectional forms may be used instead, particularly so as a means to increase the sensitivity to the thermal transfer coefficient between the temperature source and the sensor.

Furthermore, in the illustrated embodiments the thermocouple wire or wires for at least one of the sensors is shown connected to a central location on the disk or strip, whereas in some cases it may be preferable to offset the thermal junction from the center to a radially displaced position. The output from a sensor having a thermal junction displaced in this manner is somewhat more easily interpreted because of the more satisfactory operating point on the temperature gradient curve (i.e., the greater slope of the curve at this offset location enhances accuracy of measurements).

These and other aspects of the invention will be recognized from the foregoing disclosure of presently preferred embodiments and practices thereof.

I claim as my invention:

1. Thermal parameter indicator means comprising two thin thermally conductive strips, means to support the strips for presentation in heat transfer relationship to a temperature source, a thermal sink of a temperature differing from the source temperature and joined in heat transfer relationship to the strips at a selected location along each which establishes a thermal gradient along the strips in response to a temperature difference between said source and sink, one such strip having a different sensitivity than the other to the thermal transfer coefficient with relation to the source, separate temperature sensing means joined to the strips in heat transfer relationship therewith respectively at discrete locations spaced therealong from said sink, and means to measure difference of temperature of the thermal sink and that of each of said discrete locations.

2. Thermal parameter indicator apparatus comprising, in combination, first and second thermocouple junctions each comprising a thermal junction between a thin conductive strip and a thin dissimilar metal electrical conductor terminating on the strip, means supporting the strip of each thermocouple junction for disposition facing toward a heat source, said supporting means comprising a thermal sink joined to the strip at a predetermined location on the strip removed from said thermocouple junction thereof, said first and second thermocouple junctions respectively having measurably different sensitivities to heat transfer coefficient between the strip thereof and said heat source, whereby one such thermocouple junction assumes a different temperature than the other junction responsively to the source, and means comprising the junction between the strip and the heat sink as a further thermocouple junction, connected electrically with the first mentioned junctions, thereby to relate temperature of the first and second junctions to sink temperature.

3. The apparatus defined in claim 2, wherein the conductive strip is common to the first and second thermocouple, and the respective thermocouple junctions therein are spaced apart along the thermal gradient along the strip.

4. In combination, two heating rate sensors each comprising a thermally conductive element having thermal transfer relationship with respect to an outside temperature source and terminating in a thermal sink maintainable at a determinable temperature differing from source temperature, thereby to induce a thermal gradient along the element, said sensors having substantially equal heat transfer coefficients, and a consequent spatial distribution of heating rates therein, one such sensor having a sensitivity to source temperature differing from that of the other sensor so that the sensor elements undergo respectively different temperature rises for a given heating rate thereto, means to measure element temperatures of said sensors simultaneously each at a point along the thermal gradient of its conductive element removed from the thermal sink and therefore at different temperature from that of said sink, and means to support the two sensors both for presentation to the source temperature, said two sensors comprising separate conductive elements terminating in a common thermal sink, said means to measure element temperatures in each sensor comprising a thermocouple junction including a fine wire conductor terminating on the conductive element and means connected electrically in subtractive relationship with said junction and operable to measure temperature of the element at said sink.

5. In combination, two heating rate sensors each comprising a thermally conductive element having thermal transfer relationship with respect to an outside temperature source and terminating in a thermal sink maintainable at a determinable temperature differing from source temperature, thereby to induce a thermal gradient along the element, said sensors having substantially equal heat transfer coefficients, and a consequent spatial distribution of heating rates therein, one such sensor having a sensitivity to source temperature differing from that of the other sensor so that the sensor elements undergo respectively different temperature rises for a given heating rate thereto, means to measure element temperatures of said sensors simultaneously each at a point along the thermal gradient of its conductive element removed from the thermal sink and therefore at different temperature from that of said sink, and means to support the two sensors both for presentation to the source temperature, said two sensors comprising a common conductive strip terminating in the thermal sink, and said means to measure element temperature comprising two thermal junctions including fine wire conductors terminating at respectively different points along the thermal gradient along the strip to form thermocouple junctions therewith.

6. In combination, two heating rate sensors each comprising a thermally conductive element having thermal transfer relationship with respect to an outside temperature source and terminating in a thermal sink maintainable at a determinable temperature differing from source temperature, thereby to induce a thermal gradient along the element, said sensors having substantially equal heat transfer coefficients, and a consequent spatial distribution of heating rates therein, one such sensor having a sensitivity to source temperature differing from that of the other sensor so that the sensor elements undergo respectively different temperature rises for a given heating rate thereto, means to measure element temperatures of said sensors simultaneously each at a point along the thermal gradient of its conductive element removed from the thermal sink and therefore at different temperature from that of said sink, and means to support the two sensors both for presentation to the source temperature, said two sensors comprising a common conductive element terminating on the thermal sink, and said means to measure element temperature comprising separate electrical conductors terminating at respectively different points along the thermal gradient along the element to form thermocouple junctions therewith.

7. In combination, two heating rate sensors having temperature sensitive elements in thermal transfer relationship with respect to an outside temperature source and referenced to means of a determinable temperature differing from the source temperature, thereby to induce a thermal gradient along said elements, said sensors having respective heat transfer coefficients in a predetermined ratio, and a consequent spatial distribution of heating rate in the sensors, one such sensor having a sensitivity to source temperature differing from that of the other sensor so that the sensor elements undergo respectively different temperature rises for a given heating rate thereto, means to measure element temperatures of the respective sensors simultaneously each at a point along the thermal gradient removed from its reference temperature and therefore at a different temperature from that of said determinable temperature means, means to support the two sensors both for presentation to the source temperature, and means to calibrate the sensors electrically by inducing a thermal gradient therein simulating that induced by an outside temperature source, including means to heat the sensor by electrical power.

8. The combination defined in claim 7, wherein each sensor comprises an elongated conductive strip of predetermined cross section and the means to heat the sensor comprises means to pass heating current lengthwise through the strip.

References Cited by the Examiner

UNITED STATES PATENTS

| | | | |
|---|---|---|---|
| 2,681,573 | 6/1954 | Brown | 73—341 |
| 2,938,122 | 5/1960 | Cole | 73—355 |
| 3,075,386 | 1/1963 | Daly | 73—355 |
| 3,139,752 | 6/1964 | Giedt | 73—341 |

OTHER REFERENCES

Gardon: An Instrument for the Direct Measurement of Intense Thermal Radiation, in "Review of Scientific Instruments," volume 24, No. 5, Page 366, Copy in Scientific Library.

LOUIS R. PRINCE, *Primary Examiner.*

DAVID SCHONBERG, S. H. BAZERMAN, C. C. ELLS, R. W. KOPP, *Assistant Examiners.*